United States Patent
Hjelmberg et al.

(10) Patent No.: US 9,452,376 B2
(45) Date of Patent: Sep. 27, 2016

(54) FILTER AND METHOD FOR ASSEMBLING A NOZZLE PIPE OF A FILTER

(71) Applicant: ALSTOM Technology Ltd, Baden (CH)

(72) Inventors: Anders Erik Martin Hjelmberg, Växjö (SE); Gunnar Mysjo, Växjö (SE)

(73) Assignee: General Electric Technology GmbH, Baden (CH)

( * ) Notice: Subject to any disclaimer, the term of this patent is extended or adjusted under 35 U.S.C. 154(b) by 324 days.

(21) Appl. No.: 14/049,342

(22) Filed: Oct. 9, 2013

(65) Prior Publication Data

US 2015/0096929 A1 Apr. 9, 2015

(51) Int. Cl.
B01D 35/00 (2006.01)
B01D 35/30 (2006.01)
B01D 69/10 (2006.01)
B01D 46/00 (2006.01)

(52) U.S. Cl.
CPC ........... B01D 35/30 (2013.01); B01D 46/0068 (2013.01); B01D 69/10 (2013.01); *Y10T 29/49895* (2015.01)

(58) Field of Classification Search
CPC .. B01D 35/30; B01D 69/10; B01D 46/0068; Y10T 29/49895
USPC ......... 210/250; 29/464; 55/302; 248/5, 74.3, 248/674–675, 65
See application file for complete search history.

(56) References Cited

U.S. PATENT DOCUMENTS

| 1,329,268 A | * | 1/1920 | Dickelmann | F16L 3/04 248/231.91 |
| 6,676,720 B1 | * | 1/2004 | Simonsen | B01D 46/0031 55/283 |
| 2015/0096929 A1 | * | 4/2015 | Hjelmberg | B01D 35/30 210/250 |

OTHER PUBLICATIONS

Building an Air Tank, http://weldingweb.com/archive/index.php/t-8188.html, Dec. 27, 2006, last visited Oct. 29, 2015.*

* cited by examiner

*Primary Examiner* — Thomas McKenzie
(74) *Attorney, Agent, or Firm* — Rita D. Vacca

(57) ABSTRACT

The filter includes: a structure with a C-shaped profile defining side walls and nozzle pipes, each connected to the structure. Each nozzle pipe has a longitudinal axis and an end; a plate connected over a border of the nozzle pipe end to close the nozzle pipe. The plate extends beyond the border. The end of the nozzle pipe is inserted between the side walls of the C-shaped profile. The plate is connected between the side walls of the C-shaped profile. A U-shaped pin defines a first and a second leg, wherein the first leg is inserted in holes of the side walls of the C-shaped profile. The first and the second leg rest on the nozzle pipe and embracing the nozzle pipe. The plate is at an angle (A) greater than 0° with a plane perpendicular to the longitudinal axis of the nozzle pipe. The second leg has a protrusion that rests against the plate.

9 Claims, 4 Drawing Sheets

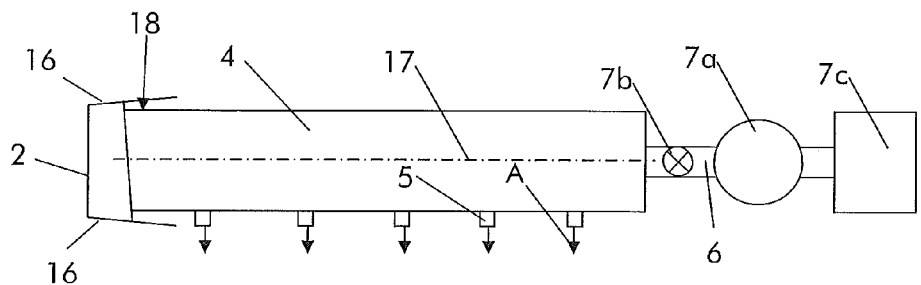
Fig. 4
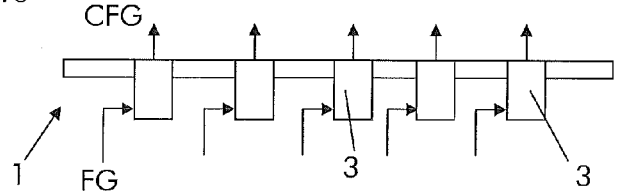
Fig. 5
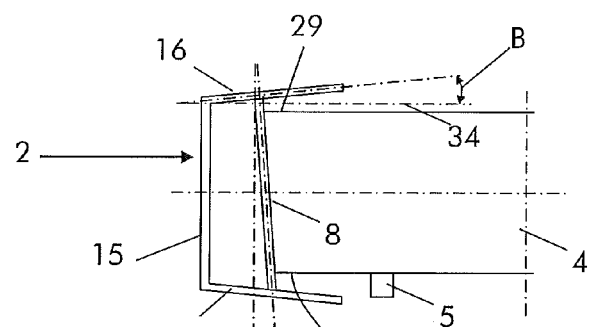
Fig. 6
Fig. 7

FILTER AND METHOD FOR ASSEMBLING A NOZZLE PIPE OF A FILTER

TECHNICAL FIELD

The present disclosure relates to a filter and a method for assembling a nozzle pipe of a filter. In particular the filter is a filter for treatment of flue gas from a power plant or an industrial process.

BACKGROUND

With reference to FIGS. 1-3, filters for treatment of flue gas comprise a structure 1 with a C-shaped profile 2 and a plurality of filter bags 3 (also hundreds or thousand) through which the flue gas is conveyed to remove dust and particles from them. Arrows FG shows the flue gas directed through the filter bags 3 and arrows CFG shows the flue gas directed to further treatment after dust and particle removal.

The filter bags 3 need periodical cleaning to maintain their efficiency.

In order to clean the filter bags 3, nozzle pipes 4 are provided that carry nozzles 5; each nozzle 5 is aligned with a filter bag 3. Each nozzle pipe 4 is connected at one side to a pipe 6 in turn connected to a pressure vessel 7a with a valve 7b, supplied by a compressor 7c that supply compressed air to clean the filter bags 3, and at the other side it is connected to and supported by the C-shaped profile 2.

The connection of the nozzle pipe 4 to the C-shaped profile is shown at FIGS. 2 and 3.

The connection is achieved by providing a plate 8 to close the end of the nozzle pipe 4 and by fixing (for example by forcing) the plate 8 into the C-shaped profile. This way possible vertical movement (as shown by arrow V) are prevented.

Then a U-shaped pin 9 is provided with one leg into holes of the C-shaped profile. The legs of the U-shaped pin are made to embrace the nozzle pipe 4. This way possible lateral movements (as shown by arrow L) are prevented.

During cleaning (this occurs periodically), compressed air is provided from the pressure vessel 7a (with the valve 7b open) through the pipe 6 into the nozzle pipe 4; this compressed air is ejected through the nozzles 5 as indicated by arrows A.

The compressed air has a higher pressure than the flue gas FG, such that without stopping the flue gas flow, the compressed air A can pass through the filter bags 3 and clean the filter bags 3.

Existing filters have some drawbacks.

In fact, possible horizontal movement of the nozzle pipe 4 as indicated by arrow H are not prevented. In some cases a stop can be provided, but it does not prevent horizontal vibrations in direction H that are generated for example when compressed air supply into the nozzle pipe 4 is started or interrupted. Vibrations in turn cause noise, wear and structural loads (fatigue).

In addition, the removal and insertion of the nozzle pipe 4 with the plate 8 connected to it into the C-shaped profile 2 is very troubling, such that assembling and disassembling of the nozzle pipe 4 is very time consuming. Assembling and disassembling of the nozzle pipe 4 is periodically needed for example for replacement of the filter bags 3.

SUMMARY

An aspect of the disclosure includes providing a filter that during operation withstands limited vibrations, such that noise and wear are counteracted.

Another aspect of the disclosure includes providing a filter and a method for assembling and disassembling a nozzle pipe of a filter, in which removal and connection of the nozzle pipe to the C-shaped profile are easy.

These and further aspects are attained by providing a filter and a method for assembling a nozzle pipe of a filter in accordance with the accompanying claims.

BRIEF DESCRIPTION OF THE DRAWINGS

Further characteristics and advantages will be more apparent from the description of a preferred but non-exclusive embodiment of the filter and a method for assembling a nozzle pipe of a filter, illustrated by way of non-limiting example in the accompanying drawings, in which:

FIG. 4 shows schematic view of a filter;

FIG. 5 shows a nozzle pipe inserted into a C-shaped profile;

FIGS. 6 and 7 show a front and side view of a U-shaped pin;

DETAILED DESCRIPTION

With reference to the FIGS. 4-14, these show a filter.

The filter comprises the structure 1 having the C-shaped profile 2. The C-shaped profile 2 defines a central wall 15 and side walls 16 extending from the central wall 15.

Figure 1:
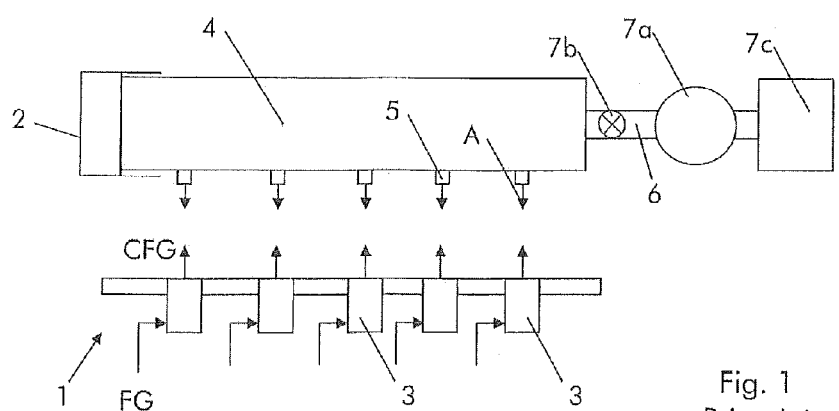
FIGS. 1 through 3 show schematic views of a filter according to the prior art.
Figure 2:
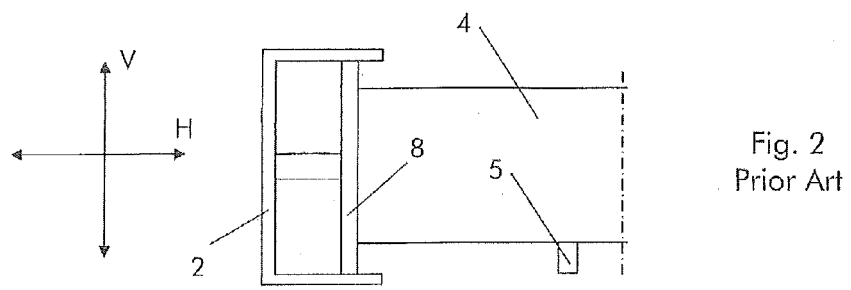
Figure 3:
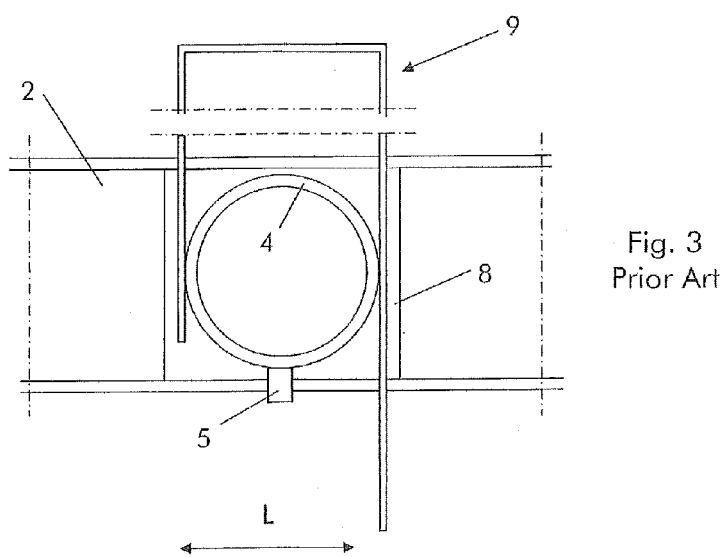
Figure 8:
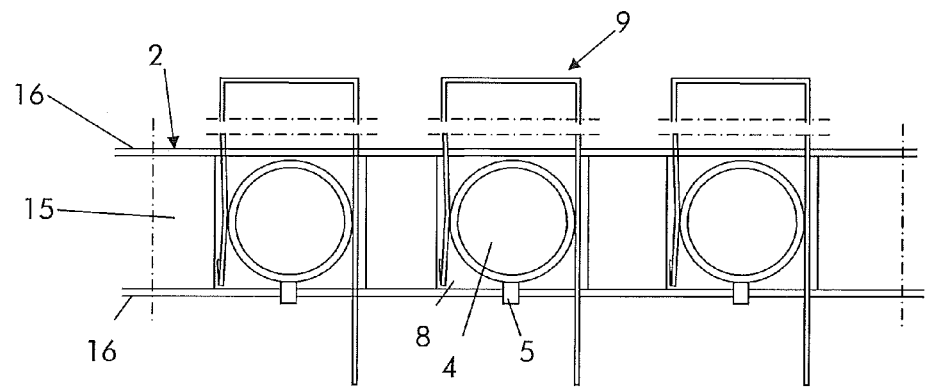
FIG. 8 shows a cross section trough the nozzle pipes and facing the C-shaped profile.
Figure 9:
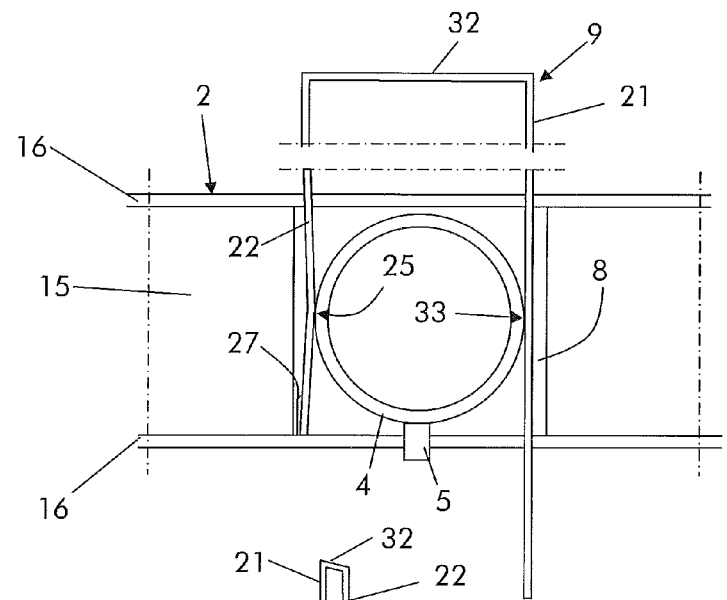
FIG. 9 is an enlarged view of a particular of FIG. 8.
Figure 10:
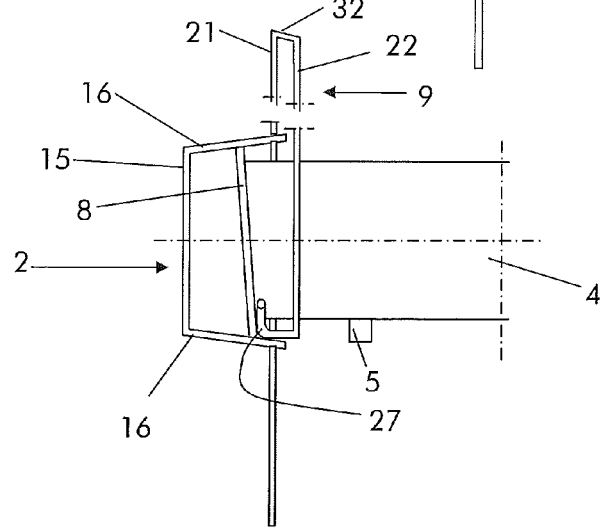
FIG. 10 shows a side view of a nozzle pipe connected to a C-shaped profile.
Figure 11:
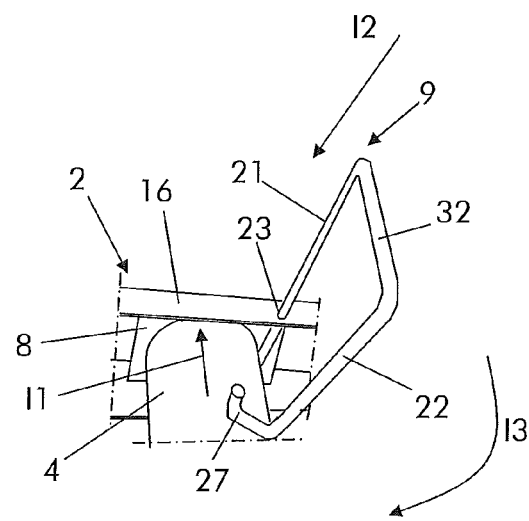
FIGS. 11 through 14 shows perspective views of the nozzle pipe connected or during connection to/disconnection from the C-shaped profile.

In addition, the filter has one or usually more than one nozzle pipe 4 connected to the structure 1 (FIG. 8). Each nozzle pipe 4 has a longitudinal axis 17 and an end 18.

The filter also has the plate 8 that is connected over a border 19 of the nozzle pipe end 18 to close the nozzle pipe 6 (FIG. 4); the plate 8 extends beyond the border 19.

The end 18 of the nozzle pipe 4 is inserted between the side walls 16 of the C-shaped profile 2 and the plate 8 is connected between the side walls 16 of the C-shaped profile 2; for example the plate 8 is forced between the side walls 16.

The U-shaped pin 9 is also provided to connect the nozzle pipe 4 to the C-shaped profile 2. The U-shaped pin 9 defines a first leg 21 and a second leg 22. The first leg 21 is inserted in holes 23 of the side walls 16 of the C-shaped profile 2 and a portion of the first leg rests at 33 on the nozzle pipe 4; in addition, the second leg 22 (a portion thereof) rests on a surface of the nozzle pipe 4 as indicated by arrow 25. This way the first and second legs 21, 22 of the U-shaped pin 9 embrace the nozzle pipe 9.

The plate 8 is at an angle A greater than 0° with a plane 26 perpendicular to the longitudinal axis 17 of the nozzle pipe 4.

In addition, the second leg 22 of the U-shaped pin has a protrusion 27 that rests against the plate 8. Preferably the protrusion 27 extends substantially parallel to the longitudinal axis 17 of the nozzle pipe 4 when the nozzle pipe 4 is connected to the structure 1.

The nozzle pipe 4 has a top part 29 and a bottom part 30, wherein the top part 29 extends beyond the bottom part 30 with respect to the nozzle pipe longitudinal axis 17.

Preferably the angle A is smaller than 15° and more preferably the angle A is comprised between 8° and 2°. This allows an easy introduction of the nozzle pipe 4 between the side walls 16 of the C-shaped profile 2.

In the embodiment shown in the attached figures, the protrusion has a part extending parallel to the longitudinal axis 17 of the nozzle pipe 4 and a part inclined with respect to this. Naturally also different embodiments for the protrusion 27 are possible.

When the nozzle pipe 4 is connected to the structure 1, the protrusion 27 rests on a side wall 16 of the C-shaped profile (namely the side wall 16 at the bottom of the C-shaped profile 2).

The U-shaped pin 9 has a central part 32 from which the first leg 21 and the second leg 22 extend. The first leg 21 and the second leg 22 have converging zones. The converging zones help defining the rest 25 and can be provided at intermediate parts of the first and second legs 21, 22. Preferably, the first leg 21 is a straight leg and the second leg 22 is bent at its intermediate part towards the first leg 21 to define the converging zones.

Preferably the side walls 16 of the C-shaped profile 2 diverge. The side walls 16 define an angle B with an axis 34 parallel to the longitudinal axis 17 of the nozzle pipe 4; the angle B is greater than 0° and smaller than 15°, and preferably this angle B is comprised between 2° and 8°.

The operation of the filter is apparent from that described and illustrated and is substantially the following.

Assembling

With reference to FIGS. 11 through 14, in order to connect the nozzle pipe 4 to the C-shaped profile 2, the end 18 of the nozzle pipe 4 with the plate 8 connected to it is introduced between the side walls 16 as indicated by arrow I1. The inclined plate 8 helps introduction; in addition the diverging side walls 16 further help introduction.

Preferably the pipe nozzle 4 is forced between the side walls 16.

Figure 12:
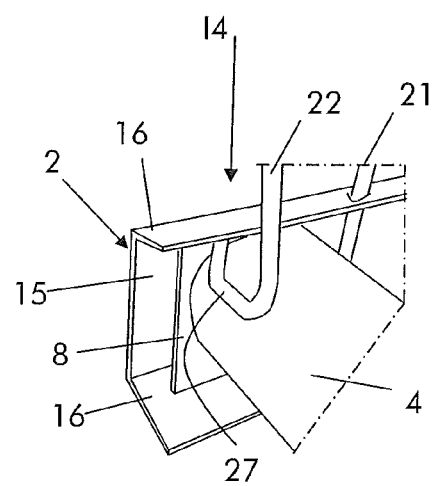

Then the first leg 21 of the U-shaped pin 9 is introduced in the holes 23 of the side walls 16 (arrow I2), then the U-shaped pin 9 is rotated (arrow I3) and the U-shaped pin 9 is brought in the position shown in FIG. 12, with the protrusion 27 facing the plate 8.

Figure 13:
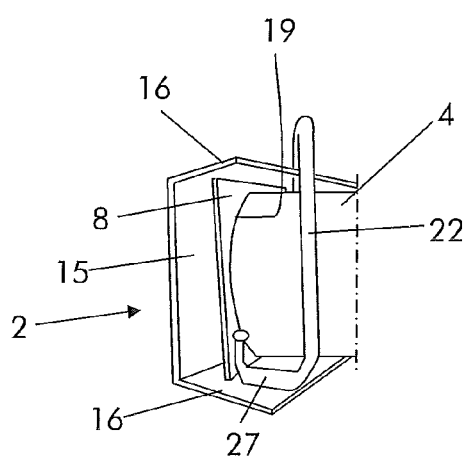
Figure 14:
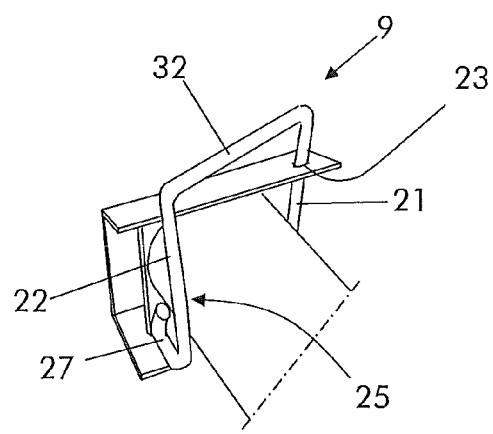

Then the U-shaped pin 9 is pushed further down as indicated by arrow I4. While the U-shaped pin 9 is moved downwards, the protrusion 27 slides on the plate 8 till the U-shaped pin 9 blocks the nozzle pipe 4 between its first and second legs 21, 22 to prevent lateral movements and with the protrusion 27 to prevent axial movements along the longitudinal axis 17. In this configuration the first leg 21 rests at 33 on the nozzle pipe 4, the second leg 22 rests at 25 on the nozzle pipe 4 and the protrusion 27 rests on the plate 8 (FIGS. 13 and 14).

Disassembling

In order to disassemble the nozzle pipe 4 from the C-shaped profile 2, the U-shaped pin 9 is moved in direction opposite the arrow I4 and then it is rotated in direction opposite the arrow I3; finally the U-shaped pin 9 can be removed from the holes 23 in direction opposite the arrow I2.

Once the U-shaped pin 9 is removed, the nozzle pipe 4 can be removed from the C-shaped profile 2 in direction opposite the arrow I1. Also in this case, the inclined plate 8 helps removal. In addition, the diverging side walls 16 further helps removal.

Method

The present disclosure also refers to a method for assembling the nozzle pipe 4 of a filter.

The method comprises inserting the end 18 of the nozzle pipe 4 between the side walls 16 of the C-shaped profile 2, inserting the first leg 21 of the U-shaped pin 9 in the holes 23 of the side walls 16 of the C-shaped profile 2, moving the U-shaped pin 9 to embrace the nozzle pipe 4 with the first leg 21 and the second leg 22 resting on the nozzle pipe 4 (preferably at opposite or substantially opposite parts of the nozzle pipe 4) and to block (preferably by forcing) the protrusion 27 with the plate 8, in order to connect the nozzle pipe 4 between the side walls 16 of the C-shaped profile 2.

Since the plate 8 is inclined, when the connection of the nozzle pipe 4 to the C-shaped profile 2 is completed and the protrusion 27 rests on the plate 8, the protrusion 27 axially pushes the plate 8 (i.e. in direction of the longitudinal axis 17 of the nozzle pipe 4), to achieve an axial blockage of the nozzle pipe 4 to the C-shaped profile.

The present disclosure also refers to a method for disassembling a nozzle pipe of a filter.

The method comprises removing the U-shaped pin 9 to un-block the protrusion 27 from the plate 8 and to un-embrace the nozzle pipe 4 from the first leg 21 and the second leg 22, removing the first leg 21 from the holes 23 of the side walls 16 of the C-shaped profile 2, removing the end 18 of the nozzle pipe 2 from the side walls 16 of the C-shaped profile 2.

Naturally the features described may be independently provided from one another.

In practice the materials used and the dimensions can be chosen at will according to requirements and to the state of the art.

The invention claimed is:

1. A nozzle pipe assembly of a filter cleaning system comprising:
    a structure comprising a C-shaped profile defining a central wall, first side wall and a second side wall, the first and second side walls extending divergently from the central wall;
    at least one nozzle pipe connected to the structure, the nozzle pipe having a longitudinal axis and an end;
    a plate connected to a border of the end of the nozzle pipe to close the end of the nozzle pipe, the plate extending beyond the border;
    the end of the nozzle pipe arranged between the diverging first side wall and the second side wall of the C-shaped profile with the plate being connected between the diverging first side wall and second side wall of the C-shaped profile at a plate angle greater than 0° with a plane perpendicular to the longitudinal axis of the nozzle pipe;
    a U-shaped pin defining a central part, a first leg and a second leg; the first leg arranged through a hole in the first side wall of the C-shaped profile; and
    the U-shaped pin is rotatable to arrange the second leg to abut the first side wall of the C-shaped profile with a protrusion from the second leg abutting the plate, with the first leg and the second leg converging to embrace the nozzle pipe.

2. The system according to claim 1, wherein the nozzle pipe has a top part and a bottom part, with the top part extending beyond the bottom part with respect to the nozzle pipe longitudinal axis.

3. The system according to claim 1, wherein the plate angle is smaller than 15°.

4. The system according to claim 1, wherein the protrusion abuts the second side wall of the C-shaped profile.

5. The system according to claim 1, wherein the protrusion abuts the first side wall of the C-shaped profile a distance from the second leg abutting the first side wall of the C-shaped profile.

6. The system according to claim 1, wherein the first side wall and the second side wall of the C-shaped profile diverge away from the nozzle pipe.

7. The system according to claim 6, wherein the first side wall and the second side wall define a wall angle with an axis parallel to the longitudinal axis of the nozzle pipe, with the wall angle greater than 0° and smaller than 15°.

8. A method for assembling a nozzle pipe of a filter cleaning system, comprising:
   providing a structure comprising a C-shaped profile defining a central wall, a first side wall and a second side wall, the first and second side walls extending divergently from the central wall;
   providing at least one nozzle pipe for connection to the structure, the nozzle pipe having a longitudinal axis and an end;
   connecting a plate to a border of the end of the nozzle pipe to close the end of the nozzle pipe with the plate extending beyond the border;
   providing a U-shaped pin defining a first leg and a second leg;
   providing a hole in the first side wall of the C-shaped profile;
   arranging the plate at a plate angle greater than 0° with a plane perpendicular to the longitudinal axis of the nozzle pipe, the second leg has a protrusion,
   inserting the first leg through the hole in the first side wall of the C-shaped profile; and
   rotating the U-shaped pin until the second leg abuts the first side wall and a protrusion on the second leg abuts the plate for converging zones of the first leg and the second leg converging to embrace the nozzle pipe.

9. A method for disassembling a nozzle pipe of a filter cleaning system, comprising:
   providing a structure comprising a C-shaped profile defining a central wall, a first side wall and a second side wall, the first and second walls extending divergently from the central wall;
   providing at least one nozzle pipe for connection to the structure, the nozzle pipe having a longitudinal axis and an end;
   connecting a plate to a border of the end of the nozzle pipe to close the end of the nozzle pipe, with the plate extending beyond the border;
   providing a U-shaped pin defining a first leg and a second leg;
   providing a hole in the first side wall of the C-shaped profile;
   providing the plate arranged with the C-shaped profile at a plate angle greater than 0° with a plane perpendicular to the longitudinal axis of the nozzle pipe;
   rotating the U-shaped pin to distance a protrusion on the second leg away from the plate and away from the first side wall to un-embrace the nozzle pipe from between converging zones of the first leg and the second leg;
   removing the first leg from the hole of the first side wall of the C-shaped profile; and
   removing the plate connected to the end of the nozzle pipe from between the first side wall and the second side wall of the C-shaped profile.

* * * * *

UNITED STATES PATENT AND TRADEMARK OFFICE
CERTIFICATE OF CORRECTION

PATENT NO. : 9,452,376 B2  
APPLICATION NO. : 14/049342  
DATED : September 27, 2016  
INVENTOR(S) : Hjelmberg et al.

Page 1 of 1

It is certified that error appears in the above-identified patent and that said Letters Patent is hereby corrected as shown below:

In the Specification

In Column 1, Line 51, delete "stop can" and insert -- stop 10 can --, therefor.

In the Claims

In Column 5, Lines 4-5, in Claim 5, delete "profile a distance" and insert -- profile distance --, therefor.

In Column 5, Line 32, in Claim 8, delete "protrusion," and insert -- protrusion; --, therefor.

Signed and Sealed this  
Tenth Day of January, 2017

Michelle K. Lee  
*Director of the United States Patent and Trademark Office*